M. FAURE.
ADJUSTABLE MIRROR REFLECTOR.
APPLICATION FILED JULY 20, 1917.
1,276,512. Patented Aug. 20, 1918.
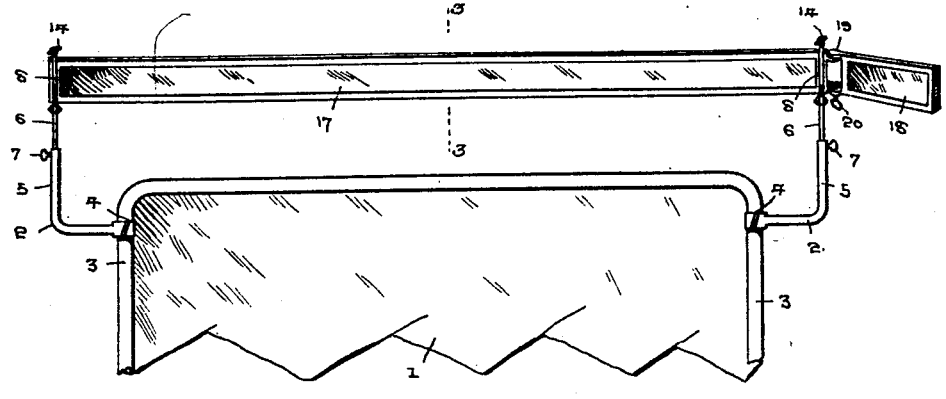
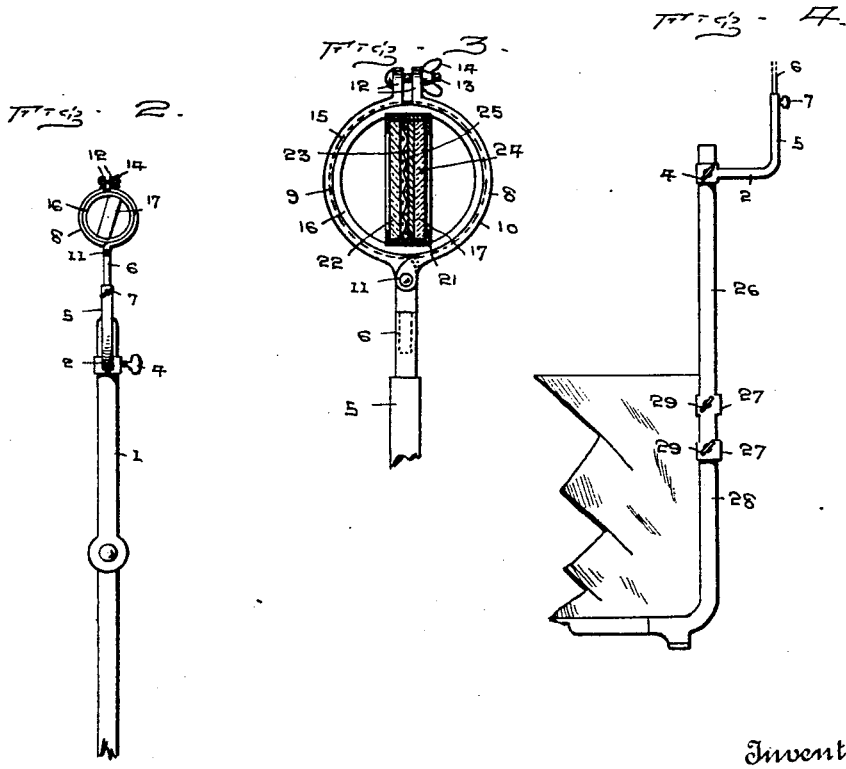
Witnesses
Inventor
M. Faure
By W. T. FitzGerald & Co.
Attorney

UNITED STATES PATENT OFFICE.

MARIE FAURE, OF NEW ORLEANS, LOUISIANA.

ADJUSTABLE MIRROR-REFLECTOR.

1,276,512.  Specification of Letters Patent.  Patented Aug. 20, 1918.

Application filed July 20, 1917. Serial No. 181,852.

*To all whom it may concern:*

Be it known that I, (Mrs.) MARIE FAURE, a citizen of the United States, residing at New Orleans, in the parish of Orleans and State of Louisiana, have invented certain new and useful Improvements in Adjustable Mirror-Reflectors; and I do hereby declare the following to be a full, clear, and exact description of the invention, such as will enable others skilled in the art to which it appertains to make and use the same.

This invention relates to new and useful improvements in mirror reflectors adapted to be attached to and rotatably supported above the wind shield of an automobile or other vehicle, said reflector having a bright side and a darkened side whereby when the sun is shining brightly the darkened side may be presented so that the drive of the vehicle may have a clear vision to the rear of him without dazzling his eyes, and when the sun is not shining brightly, the bright side may be presented to the driver for a clear vision to the rear of him.

Another object of the invention is to provide means for frictionally or adjustably supporting the mirror reflector in any desired rotated position and to further provide means for adjusting the mirror vertically.

A further object of the invention is to pivotally connect a small mirror reflector having a darkened and brightened side to one end of the main mirror reflector and means for adjusting and securing the small mirror in any angular relation with respect to the main mirror.

With these and other objects in view as will appear as the description proceeds, the invention comprises the various novel features of construction, combination and arrangement of parts as will be more fully described hereinafter and afterward specifically claimed.

Referring to the drawings,

Figure 1 represents a side elevation of my novel construction of mirror reflector attached to the upper portion of a vehicle wind shield.

Fig. 2 represents an end view of the device.

Fig. 3 represents an enlarged transverse sectional view taken on the line 3—3 of Fig. 1, and Fig. 4 represents a side elevation of a modified form of supporting means for supporting the reflector from the lower section of the wind shield.

Similar characters of reference are used to denote corresponding parts throughout the accompanying drawings and the following description.

In order that the construction and operation of the invention may be readily comprehended I have illustrated an approved embodiment thereof in the accompanying drawings and will now proceed to fully describe the same, in connection with said drawings, in which the reference numeral 1 indicates an ordinary wind shield or the upper section of an ordinary foldable wind shield. An angular bracket 2 is adjustably connected to each end of the wind shield. The lower inner end of each angular bracket 2 is split to embrace the outer circumference of the wind shield frame 3 and is securely clamped and held thereto in any desired adjusted position through the medium of a set screw 4 which extends through the end of the bracket into engagement with the wind shield frame. The upper vertical portion 5 of each bracket is tubular for the reception of a supporting stem 6 which is adapted to be held in any adjusted position by a set screw 7 extending through the bracket.

The upper end of each of the stems 6 is provided with a collar 8, which consists of a stationary section 9 and a movable section 10. The lower end of the movable section is hingedly connected as at 11 to the lower end of the stationary section, and the upper ends of both sections are provided with laterally extending ears 12 through which extends a clamping bolt 13 provided with a thumb nut 14 whereby the sections may be drawn together as desired. The inner circumference of the collar 8 is provided with an annular channel 15 for the reception of a supporting ring 16.

An elongated main mirror reflector 17 has its opposite ends extending through and rigidly supported with the rings 16 of the supporting collars 8. By the construction of the supporting collars 8 it will be apparent that any desired amount of frictional tension may be placed on the supporting rings 16 to hold and maintain the main mirror reflector in any desired rotated position.

A small or auxiliary mirror reflector 18 is pivotally connected as at 19 to one end of the main mirror reflector and is adapted to be held in any adjusted position with respect to the main reflector by a thumb screw 20. By the provision of this small mirror attached to the end of the main mirror, a clear view may be had of the side of the machine and immediately in rear thereof.

The small reflector is identical in construction with the main or larger reflector, therefore a description of one it is thought will suffice for both. By reference to Fig. 3 it will be noted that the main mirror reflector embodies a suitably constructed frame 21 in which is mounted a plain transparent piece of glass 22 disposed at one side of the frame and backed with a piece of opaque fabric, paper or other material 23, to present a darkened or subdued reflecting surface. An ordinary mirror 24 is mounted within the opposite side of the frame and is backed with quicksilver or any other suitable or well known backing 25, so as to present a bright reflecting surface.

By the provision of mirror reflectors of the above stated character it will be manifest that when the sun is shining brightly the darkened or subdued reflecting surface of the mirror reflector may be presented so that a clear view to the rear of the vehicle may be had without dazzling the eye and when the sun is not shining the bright side of the reflector may be presented to give a clearer view.

While I have shown and described the mirror reflector as being supported from the upper section of a wind shield, it is of course to be understood that if desirable it may be supported from the lower section of the wind shield and to this end I have provided extension bars 26, each of which, as clearly shown in Fig. 4 has its lower end provided with clamping arms 27 adapted to embrace the wind shield frame 28 and are securely held thereto in adjusted position by set screws 29. The upper ends of the extension bars are adapted to adjustably support the lower ends of the brackets 2 previously described and are securely held in adjusted position by the set screws 4. By the use of these extension bars it will be apparent that the upper section of the wind shield may be folded down against the lower section to allow of a clear vision between the lower section and the mirror reflector and at the same time permit of a free circulation of air. The extension bars 26 are used to support the mirror reflector as just described and may be placed within the vehicle tool box when not in use. It is also to be noted that by making the device of a length slightly greater than the width of the wind shield the main mirror can be rotatably adjusted to obtain any desired rearward range of vision.

I claim:

1. The combination with a vehicle wind shield, of an elongated mirror reflector, means for rotatably supporting said mirror reflector horizontally above said wind shield and a smaller mirror reflector pivotally connected to one end of said first named reflector.

2. The combination with a vehicle wind shield, of an elongated mirror reflector, means for rotatably supporting said reflector horizontally above said wind shield, a smaller mirror reflector pivotally connected to one end of said first named mirror reflector, and means for adjusting said smaller mirror in angular relation with said first mentioned mirror.

3. The combination with a vehicle wind shield, of a pair of vertically extensible brackets, a split collar carried by the upper end of each of said brackets, an elongated mirror, rings fixed to the opposite ends of said mirror and rotatably mounted within said collar, and means for clamping said collars to said rings to hold the mirror in adjusted position.

4. The combination with a vehicle wind shield, of a pair of vertically adjustable brackets, each bracket being provided at its upper end with a collar consisting of a stationary section and a movable section, a mirror, rings carried by the opposite ends of said mirror and rotatably mounted within said collars, and means for clamping said movable and stationary collar sections together on said rings.

5. The combination with a vehicle wind shield, of a pair of angular brackets adjustably connected thereto, vertically adjustable stems carried by said brackets, a split collar carried by the upper end of each stem, a mirror, rings on the opposite ends of said mirror rotatably mounted within said split collars, and means for drawing said split collars together over said rings.

6. The combination with a vehicle wind shield, of a pair of brackets adjustably attached thereto, a stem adjustably supported by each bracket, a collar carried by each stem and consisting of a stationary section and a movable section having one end hingedly connected to said stationary section, both of said sections being provided with an inner circumferential groove, a mirror, rings on opposite ends of the mirror mounted in the circumferential grooves of said collars, and means for drawing said collar sections together over said rings to hold the mirror in adjusted position.

7. A mirror reflector comprising a frame, a bright reflecting mirror arranged in one side of said frame, and a subdued light reflecting mirror arranged in the other side of said frame.

In testimony whereof I have signed my name to this specification in the presence of two subscribing witnesses.

MARIE FAURE.

Witnesses:
Mrs. J. V. CALHOUN, Jr.,
J. V. CALHOUN, Jr.

Copies of this patent may be obtained for five cents each, by addressing the "Commissioner of Patents, Washington, D. C."